US010828708B2

(12) United States Patent
Kitai (10) Patent No.: US 10,828,708 B2
(45) Date of Patent: Nov. 10, 2020

(54) BAND SAW MACHINE (71) Applicants: AMADA HOLDINGS CO., LTD., Kanagawa (JP); AMADA MACHINE TOOLS CO., LTD., Kanagawa (JP)

(72) Inventor: Masataka Kitai, Kanagawa (JP)

(73) Assignees: AMADA HOLDINGS CO., LTD., Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 0 days.

(21) Appl. No.: 15/765,591

(22) PCT Filed: Sep. 27, 2016

(86) PCT No.: PCT/JP2016/078427
§ 371 (c)(1),
(2) Date: Apr. 3, 2018

(87) PCT Pub. No.: WO2017/073222
PCT Pub. Date: May 4, 2017

(65) Prior Publication Data
US 2019/0076942 A1 Mar. 14, 2019

(30) Foreign Application Priority Data
Oct. 27, 2015 (JP) ................. 2015-210721

(51) Int. Cl.
B23D 53/04 (2006.01)
B23D 55/04 (2006.01)
(Continued)

(52) U.S. Cl.
CPC ............ B23D 53/04 (2013.01); B23D 55/00 (2013.01); B23D 55/04 (2013.01); B23D 55/043 (2013.01);
(Continued)

(58) Field of Classification Search
CPC ........ B23D 53/04; B23D 55/00; B23D 55/04; B23D 55/043; B23D 55/065; B23D 55/082; B23Q 11/00; B23Q 3/06
(Continued)

(56) References Cited

U.S. PATENT DOCUMENTS 784,184 A * 3/1905 Sebrell ................... B23D 53/04
83/794
2,104,258 A * 1/1938 Nightingale ......... B23D 53/005
83/796
(Continued)

FOREIGN PATENT DOCUMENTS

CN 102941378 2/2013
JP 9-225734 9/1997
(Continued)

OTHER PUBLICATIONS

Official Communication issued in Japan Patent Application No. PCT/JP2016/078427, dated Dec. 27, 2016.
(Continued)

Primary Examiner — Ghassem Alie
Assistant Examiner — Bharat C Patel
(74) Attorney, Agent, or Firm — Greenblum & Bernstein, P.L.C.

(57) ABSTRACT

A band saw machine includes a base having a cutting fluid reservoir, a saw blade housing movable in an up-down direction, a pair of saw blade wheels around which a band saw blade are wound, a downstream main vise having a pair of downstream main vise jaws for clamping a product correspondent portion of the workpiece, a discharge table for discharging a product to an outside of the cutting fluid reservoir, and a product feed mechanism that feed the product cut out from the workpiece to a side on an upstream end of the discharge table. A working-side running area of
(Continued)

the band saw blade and a working-opposite-side running area of the band saw blade are positioned within the cutting fluid reservoir, and the upstream end of the discharge table is positioned on a downstream side from a wheel center line connecting centers of the pair of saw blade wheels.

4 Claims, 6 Drawing Sheets (51) Int. Cl.
*B23Q 11/00* (2006.01)
*B23D 55/00* (2006.01)
*B23Q 3/06* (2006.01)
*B23D 55/06* (2006.01)
*B23D 55/08* (2006.01)
*B23Q 3/10* (2006.01)

(52) U.S. Cl.
CPC .......... *B23D 55/065* (2013.01); *B23D 55/082* (2013.01); *B23Q 3/106* (2013.01); *B23Q 11/00* (2013.01)

(58) Field of Classification Search
USPC ................... 83/794, 772, 773, 778; 248/676
See application file for complete search history.

(56) References Cited

U.S. PATENT DOCUMENTS

| | | | | | |
|---|---|---|---|---|---|
| 2,549,560 | A | * | 4/1951 | Archer | B23D 33/025 83/157 |
| 4,080,855 | A | * | 3/1978 | De George | B21D 28/265 83/157 |
| 4,170,915 | A | * | 10/1979 | Sato | B23D 55/088 83/13 |
| 4,422,815 | A | * | 12/1983 | Danhof | B21D 43/287 193/31 A |
| 4,503,743 | A | * | 3/1985 | Ryba | B23D 53/04 83/801 |
| 4,534,247 | A | * | 8/1985 | Taguchi | B23D 55/046 83/13 |
| 4,727,785 | A | * | 3/1988 | Taguchi | B23D 55/043 408/56 |
| 4,737,068 | A | * | 4/1988 | Mochizuki | B23D 55/043 198/346.2 |
| 4,805,500 | A | * | 2/1989 | Saito | B23D 53/045 83/168 |
| 4,901,612 | A | * | 2/1990 | Harris | B23D 53/08 83/56 |
| 5,148,907 | A | * | 9/1992 | Tokiwa | B23D 47/042 198/364 |
| 5,813,307 | A | * | 9/1998 | Richmond | B23D 55/023 83/788 |
| 6,698,159 | B2 | * | 3/2004 | Harris | B23D 47/04 83/247 |
| 7,143,676 | B2 | * | 12/2006 | Jourdan | B23D 47/042 83/412 |
| 9,878,381 | B2 | * | 1/2018 | Sakai | B23D 55/04 |
| 2007/0214924 | A1 | * | 9/2007 | Jourdan | B23D 53/00 83/206 |
| 2011/0011701 | A1 | | 1/2011 | Okimoto | |
| 2014/0360324 | A1 | * | 12/2014 | Tokiwa | B23D 53/04 83/23 |
| 2015/0375316 | A1 | | 12/2015 | Seto et al. | |

FOREIGN PATENT DOCUMENTS

| | | | | |
|---|---|---|---|---|
| JP | 11010480 | A | * | 1/1999 |
| JP | 2001-54818 | | | 2/2001 |
| JP | 2001-150239 | | | 6/2001 |
| JP | 2005-34957 | | | 2/2005 |
| JP | 2011-20236 | | | 2/2011 |
| JP | 2013-132724 | | | 7/2013 |
| JP | 2013-146829 | | | 8/2013 |
| JP | 2013-188861 | | | 9/2013 |
| JP | 2014-172128 | | | 9/2014 |
| WO | WO-2013099470 | A1 | * | 7/2013 ............. B23D 53/04 |
| WO | WO-2013122138 | A1 | * | 8/2013 ........... B23D 55/082 |

OTHER PUBLICATIONS

Office Action issued in Japan Counterpart Patent Appl. No. 2015-210721, dated Dec. 14, 2016, along with an english translation thereof.

Office Action issued in Japan Counterpart Patent Appl. No. 2015-210721, dated Jun. 29, 2017, along with an english translation thereof.

Decision to Grant a Patent issued in Japan Counterpart Patent Appl. No. 2015-210721, dated Oct. 31, 2017, along with an english translation thereof.

* cited by examiner

BAND SAW MACHINE

TECHNICAL FIELD

The present invention relates to a tilted-wheel type band saw machine for cutting a cut portion of a workpiece set at a cutting position on a feed direction while running its endless band saw blade.

BACKGROUND ART

Horizontal band saw machines widely prevalent recently are uprise-wheel type band saw machines in which each of its saw blade wheels is oriented vertically so as to allow a workpiece to pass through freely between a pair of the saw blade wheels, i.e. so as to get flexibility in a maximum cut length of the workpiece (a maximum length of a product). In an uprise-wheel type band saw machine, it is needed to set a twisted angle of the band saw blade large in order to orient its tooth ends perpendicular to the workpiece at the cutting position. Twisting stresses apply repeatedly to a running band saw blade in addition to tensile stresses and bending stresses. Therefore, it is hard to extend durable life of a blade body of the band saw blade.

Recently, a tilted-wheel type band saw machine that can extend durable life of a blade body of its band saw blade is put into practical use (see Patent Documents 1 and 2 listed below). Saw blade wheels of the tilted-wheel type band saw machine are in a tilted-down state, and its maximum cut length of a workpiece is regulated by a diameter of the saw blade wheels. In the tilted-wheel type band saw machine, its tooth ends can be oriented perpendicular to a workpiece at its cutting position even when a twisted angle of its band saw blade is set to 0° or a very small angle by its saw blade guides. Namely, its tooth ends can be oriented perpendicular to a workpiece at its cutting position without making a twisted angle of its band saw blade large.

Hereinafter, configuration of a tilted-wheel type band saw machine will be explained. The tilted-wheel type band saw machine includes a base. The base has an oil pan (a cutting fluid reservoir) for collecting cutting oil (cutting fluid) at its upper portion. In addition, the base includes, at its upper portion, a saw blade housing movable vertically. The saw blade housing includes, at its lower portion, a pair of saw blade wheels that supports a band saw blade. The saw blade wheels in a pair are distanced from each other in a feed width direction perpendicular to a feed direction of a workpiece. Each of the saw blade wheels is disposed horizontally, so that a distance from a cutting position to a downstream end (a downstream end along the above-mentioned feed direction) of the oil pan is longer than that in an uprise-wheel type band saw blade. Further, the saw blade housing includes saw blade guides, at its appropriate position, for guiding the band saw blade so as to orient tooth ends of the band saw blade perpendicular to a workpiece at the cutting position.

The base includes a downstream main vise just on a downstream side of the cutting position. The downstream main vise has a pair of downstream main vise jaws for clamping a product correspondent portion of a workpiece (a portion that will be a product). Since the distance from the cutting position to the downstream end of the oil pan is long as explained above, the base generally includes a discharge chute, on a downstream side of the cutting position, for discharging a product to the outside of the oil pan. The discharge chute is sloped with respect to a horizontal direction so that its downstream end is located lower than its upstream end. A downstream-side portion of the discharge chute protrudes to the outside from the oil pan.

PRIOR ART DOCUMENT

Patent Document
    Patent Document 1: Japanese Patent Application Publication No. 2013-132724
    Patent Document 2: Japanese Patent Application Publication No. 2013-188861

SUMMARY OF INVENTION

Meanwhile, it is needed to locate the upstream end of the discharge chute at the cutting position or close to the cutting position in order to discharge a product to the outside of the oil pan (the outside of the base) unfailingly. On the other hand, when locating the upstream end of the discharge chute as explained above, cutting fluid supplied to the band saw blade and cut dusts generated by cutting tend to be discharged to the outside of the oil pan (the outside of the base) through the discharge chute. As the result, the cutting fluid and the cut dusts are scattered on a floor of a factory, and thereby working environment is degraded.

An object of the present invention is to provide a band saw machine that can unfailingly discharge a product that has been cut out, and can improve working environment by sufficiently restricting cutting fluids and cut dusts from being scattered.

An aspect of the present invention provides a band saw machine for cutting a cut portion of a workpiece set at a cutting position on a feed direction while running an endless band saw blade, the machine comprising: a base that has a cutting fluid reservoir for collecting cutting fluid at an upper portion thereof; a saw blade housing that is provided at the base movably in an up-down direction; a pair of saw blade wheels that are provided rotatably in the saw blade housing to support the band saw blade and distanced from each other in a feed width direction perpendicular to the feed direction, the band saw blade being wound around the saw blade wheels in a tilted-down state so as to regulate a maximum cut length of the workpiece by a diameter thereof; a saw blade guide that guides the band saw blade so as to make tooth ends of the band saw blade perpendicular to the workpiece at the cutting position; a downstream main vise that is provided on a downstream side of the cutting position on the base and has a pair of downstream main vise jaws for clamping a product correspondent portion of the workpiece; and a discharge table for discharging a product to an outside of the cutting fluid reservoir, wherein a working-side running area of the band saw blade running through the cutting position and a working-opposite-side running area of the band saw blade running at a position distanced from the cutting position in the feed direction are positioned within the cutting fluid reservoir in a plan view, an upstream end of the discharge table is positioned on a downstream side from a wheel center line connecting rotational centers of the pair of saw blade wheels, and the band saw machine comprises a product feed mechanism that feeds the product cut out from the workpiece to a side on the upstream end of the discharge table.

DESCRIPTION OF EMBODIMENTS

Embodiments (a first embodiment and a second embodiment) will be described with reference to the drawings. A "cutting position" is a position on a feed direction where cutting is done. Note that, in the drawings, "FF" indicates a forward direction (the feed direction), "FR" indicates a rearward direction (an opposite direction to the feed direction), "L" indicates a leftward direction (a direction toward one side in a feed width direction), "R" indicates a rightward direction (a direction toward the other side in the feed width direction), "U" indicates an upward direction, and "D" indicates a downward direction, respectively.

First Embodiment

As shown in FIG. 1 to FIG. 4, a band saw machine 1 according to the first embodiment cuts a cut portion Wa of a rod-shaped workpiece W set at a cutting position CP on the feed direction (the forward direction) while circularly running an endless band saw blade B. In addition, the band saw machine 1 is a tilted-wheel type horizontal band saw machine.

Specific configuration of the band saw machine 1 will be described hereinafter. The band saw machine 1 includes a base (main frame) 3 extending in the feed width direction (left-right direction) perpendicular to the feed direction. The base 3 has an oil pan (a cutting fluid reservoir) 5 for accumulating cutting oil (cutting fluid) at its upper portion. In addition, the band saw machine 1 includes a support frame 7 provided behind the base 3 and extending in a front-rear direction. The support frame 7 also has an oil pan 9 that communicates with the oil pan 5 of the base 3 and accumulates cutting oil.

The base 3 includes, at its rear face, a pair of columns 11 and 13 extending in an up-down direction. The columns 11 and 13 in a pair are distanced from each other in the feed width direction. Each of the columns 11 and 13 has, at its front face, an LM guide (a linear motion guide) 15 or 17 extending in the up-down direction. In addition, the pair of columns 11 and 13 includes, between their upper portions, a bridging member 19 extending in the left-right direction.

The pair of columns 11 and 13 includes, between them, a saw blade housing (cutting head) 21 extending in the feed width direction and movable in the up-down direction (capable of being lifted up and down). In other words, the saw blade housing 21 is provided at the base 3, via the pair of columns 11 and 13, movably in the up-down direction. A front shape of the saw blade housing 21 is a U-shape opened downward. The saw blade housing 21 has, on its rear left face, plural LM blocks (linear motion blocks) 23 guided in the up-down direction by the LM guide 15. The saw blade housing 21 has, on its rear right face, plural LM blocks (linear motion blocks) 25 guided in the up-down direction by the LM guide 17. The saw blade housing 21 is moved in the up-down direction by a for-housing electric motor(s) (not shown in the drawings) and a ball screw(s) (not shown in the drawings), a for-housing oil hydraulic cylinder(s) (not shown in the drawings), or the like, which are/is provided at appropriate positions on the base 3.

The saw blade housing 21 includes, at its lower portion, a pair of rotatable saw blade wheels 27 and 29 around which the band saw blade B is wound and which supports the band saw blade B. The saw blade wheels 27 and 29 in a pair are distanced from each other in the feed width direction. Each of the saw blade wheels 27 and 29 is in a tilted-down state, and a maximum cut length of a workpiece W is regulated by a diameter of the saw blade wheels 27 and 29. Especially in the present embodiment, the saw blade wheels 27 and 29 are made horizontal. In addition, the first saw blade wheel 27 can be moved, by a for-wheel oil hydraulic cylinder (not shown in the drawings) provided at a left portion of the saw blade housing 21, in the feed width direction with respect to the second saw blade wheel 29 (its position is adjustable) in order to apply a tensile force to the band saw blade B. A wheel shaft (not shown in the drawings) of the second saw blade wheel 29 is coupled with an output shaft (not shown in the drawings) of a for-wheel electric motor (not shown in the drawings) provided at a right portion of the saw blade housing 21. Namely, the pair of saw blade wheels 27 and 29 is rotated by the for-wheel electric motor. Note that each of the saw blade wheels 27 and 29 may not be made horizontal, even if it is tilted down so as to regulate the maximum length of a workpiece W by its diameter.

The saw blade housing 21 includes, on its rear side, a pair of saw blade guides 31 and 33 for guiding the band saw blade B so as to make tooth ends of the band saw blade B perpendicular to a workpiece W at the cutting position CP. Since each of the saw blade wheels 27 and 29 is made horizontal, a twisted angle of the band saw blade B by the pair of saw blade guides 31 and 33 is 0°. The saw blade guides 31 and 33 in a pair are distanced from each other in the feed width direction. The first saw blade guide 31 is movable in the feed width direction with respect to the second saw blade guide 33 (its position is adjustable). Each of the saw blade guides 31 and 33 includes, at its appropriate position, a cutting oil supply device (not shown in the drawings) for supplying cutting oil (cutting fluid) to the band saw blade B. The cutting oil supply device(s) has known configurations disclosed in a Japanese Patent Application Publication No. 2001-54818, a Japanese Patent Application Publication No. 2001-150239 and so on, for example. Note that, if each of the saw blade wheels 27 and 29 is inclined (not horizontal), the twisted angle of the band saw blade B by the pair of saw blade guides 31 and 33 is not needed to be 0° (it is acceptable that the band saw blade B is twisted).

The support frame 7 includes, at its upper portion, an upstream feed table 35 for supporting a workpiece W movably in the feed direction. The upstream feed table 35 has plural upstream feed rollers 37 aligned in the feed direction at intervals. Each of the upstream feed rollers 37 is rotatable about its axial center parallel to the feed width direction.

The support frame 7 includes, at its upper portion, a pair of guide members (guide rails) 39 and 41 extending in the feed direction. The pair of guide members 39 and 41 includes, on their upper side, a feed vise 43 for feeding a workpiece W. The feed vise 43 is movable in the feed direction and in an opposite direction thereto (the front-rear direction). In other words, the feed vise 43 is provided on an upstream side of the cutting position CP on the support frame 7 so as to be movable in the feed direction and in the opposite direction via the pair of guide members 39 and 41.

The feed vise 43 has a feed vise bed (feed slider) 45 movably guided by the pair of guide members 39 and 41 in the feed direction. The feed vise bed 45 has a U-shape opened upward. Part of the feed vise bed 45 is located beneath the upstream feed rollers 37. The feed vise bed 45 doesn't contact with the upstream feed table 35. The feed vise bed 45 (the feed vise 43) is moved in the feed direction by a for-feed-vise electric motor(s) (not shown in the drawings) and a ball screw(s) (not shown in the drawings), a for-feed-vise oil hydraulic cylinder(s) (not shown in the drawings), or the like, which are/is provided at an appropriate position on the support frame 7.

The feed vise bed 45 includes, on its upper face, a pair of feed vise jaws 47 and 49 for clamping a workpiece W. The feed vise jaws 47 and 49 in a pair face to each other in the feed width direction. The first feed vise jaw 47 is moved, by a for-feed-vise oil hydraulic cylinder 51 provided at a left portion of the feed vise bed 45, in the feed width direction with respect to the second feed vise jaw 49. The second feed vise jaw 49 is moved slightly, by a for-feed-vise oil hydraulic mini cylinder (not shown in the drawings) provided at a right portion of the feed vise bed 45, in the feed width direction.

The base 3 includes, just on an upstream side of the cutting position CP along the feed direction, an upstream main vise 53 for fixing a workpiece W onto the base 3. The upstream main vise 53 is provided on an upper face of the base 3 just on an upstream side of the cutting position CP. The upstream main vise 53 has an upstream main vise bed (upstream wok table) 55 for supporting the workpiece W. The upstream main vise bed 55 includes, on its upper face, a pair of upstream main vise jaws 57 and 59 for clamping the workpiece W. The upstream main vise jaws 57 and 59 in a pair face to each other in the feed width direction. The first upstream main vise jaw 57 is moved, by a for-upstream-main-vise oil hydraulic cylinder 61 provided at a left portion of the upstream main vise bed 55, in the feed width direction with respect to the second upstream main vise jaw 59. The second upstream main vise jaw 59 is moved slightly, by a for-upstream-main-vise oil hydraulic mini cylinder (not shown in the drawings) provided at a right portion of the upstream main vise bed 55, in the feed width direction.

The base 3 includes, on a downstream side of the cutting position CP along the feed direction, a downstream feed table 63 for supporting a workpiece W movably in the feed direction. The downstream feed table 63 has plural downstream feed rollers 65 aligned in the feed direction at intervals. Each of the downstream feed rollers 65 is rotatable about its axial center parallel to the feed width direction.

The base 3 includes, on a downstream side of the cutting position CP, a pair of guide members 67 and 69 extending in the feed direction. The pair of guide members 67 and 69 includes, on their upper side, a downstream main vise 71. The downstream main vise 71 is movable in the feed direction and in an opposite direction thereto (the front-rear direction). In other words, the downstream main vise 71 is provided on a downstream side of the cutting position CP on the upper face of the base 3 so as to be movable in the feed direction and in the opposite direction via the pair of guide members 67 and 69.

The downstream main vise 71 has a downstream main vise bed (downstream main slider) 73 movably guided by the pair of guide members 67 and 69 in the feed direction. The downstream main vise bed 73 has a U-shape opened upward. Part of the downstream main vise bed 73 is located beneath the downstream feed rollers 65. The downstream main vise bed 73 doesn't contact with the downstream feed table 63. The downstream main vise bed 73 (the downstream main vise 71) is moved in the feed direction by a for-downstream-main-vise electric motor(s) (not shown in the drawings) and a ball screw(s) (not shown in the drawings), a for-downstream-main-vise oil hydraulic cylinder(s) (not shown in the drawings), or the like, which are/is provided at an appropriate position on the base 3.

The downstream main vise bed 73 includes, on its upper face, a pair of downstream main vise jaws 75 and 77 for clamping a product correspondent portion Wm of a workpiece W (a portion that will be a product M) or an offcut correspondent portion (a portion that will be an offcut I). The downstream main vise jaws 75 and 77 in a pair face to each other in the feed width direction. The first downstream main vise jaw 75 is moved, by a for-downstream-main-vise oil hydraulic cylinder 79 provided at a left portion of the downstream main vise bed 73, in the feed width direction with respect to the second downstream main vise jaw 77. The second downstream main vise jaw 77 is moved slightly, by a for-downstream-main-vise oil hydraulic mini cylinder (not shown in the drawings) provided at a right portion of the downstream main vise bed 73, in the feed width direction.

The base 3 includes, on a downstream side of the cutting position CP, a discharge chute (discharge table) 81 for discharging a product M and an offcut I to the outside of the oil pan 5 (the outside of the base 3). The discharge chute 81 is sloped so that its downstream end (outlet end) 81*d* is located lower than its upstream end (inlet end) 81*u*. A height position of the upstream end 81*u* is lower than a feed height (path line) of the downstream feed table 63. The discharge chute 81 includes, at its appropriate position, a separator 83 for separating the products M and the offcuts I from each other. The separator 83 can be swung about its swing axis 85 on its base end side by a for-separator oil hydraulic swing cylinder (not shown in the drawings). The product(s) M separated by the separator 83 is collected in a product box 87 disposed on a front side of the base 3, and the offcut(s) I separated by the separator 83 is collected in an offcut box 89 disposed on a front side of the base 3 adjacently to the product box 87. Note that, although the discharge chute 81 is fixed on the base 3 in its sloped state, it may be configured to be sloped by being swung about its swing axis (not shown in the drawings) on a side of the upstream end 81*u*.

Figure 1:
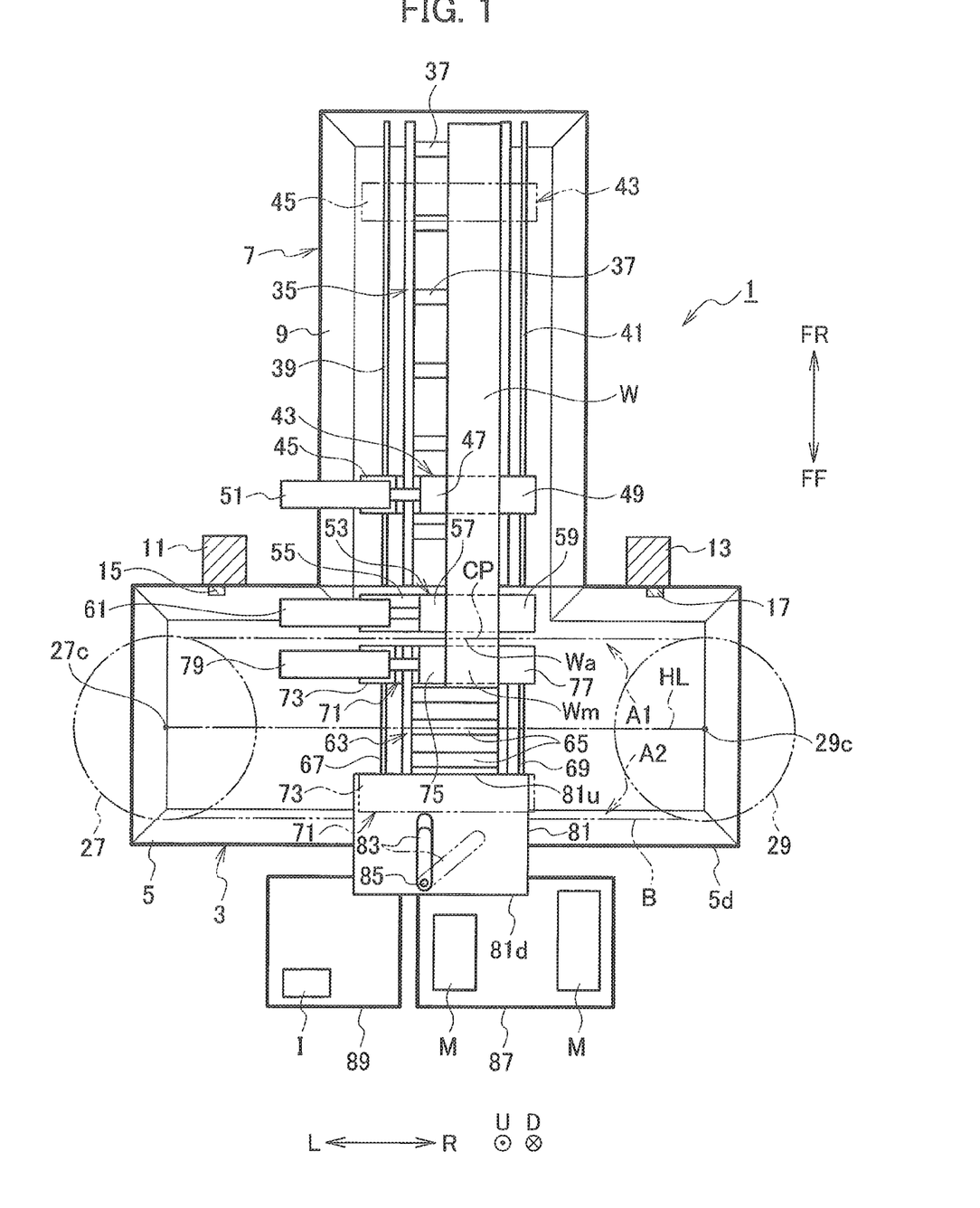
FIG. 1 is a partially cross-sectioned plan view showing a lower portion of a band saw machine according to a first embodiment (a cross-sectional view taken along a line I-I shown in FIG. 4).
Figure 2:
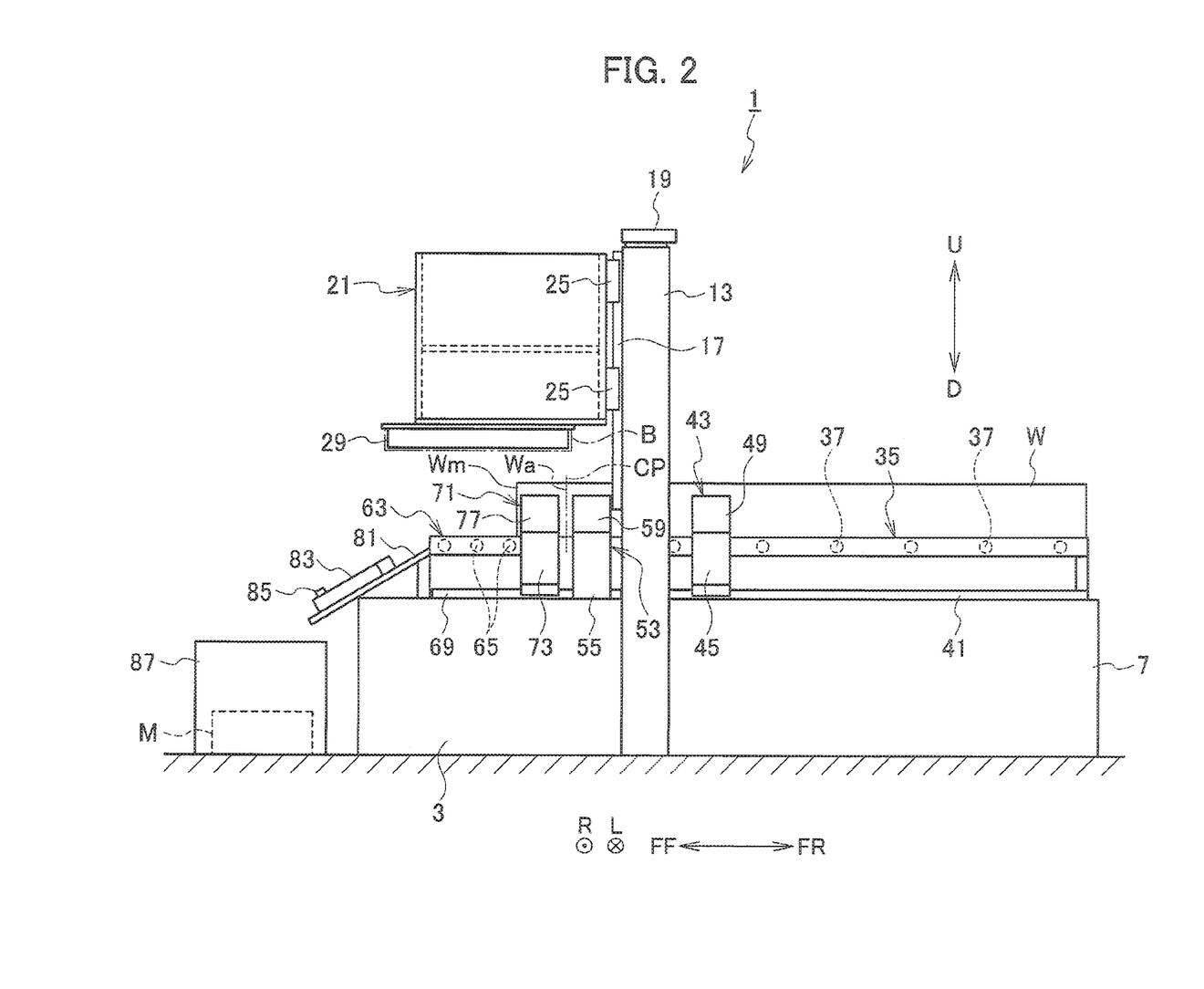
FIG. 2 is a side view of the band saw machine.
Figure 3:
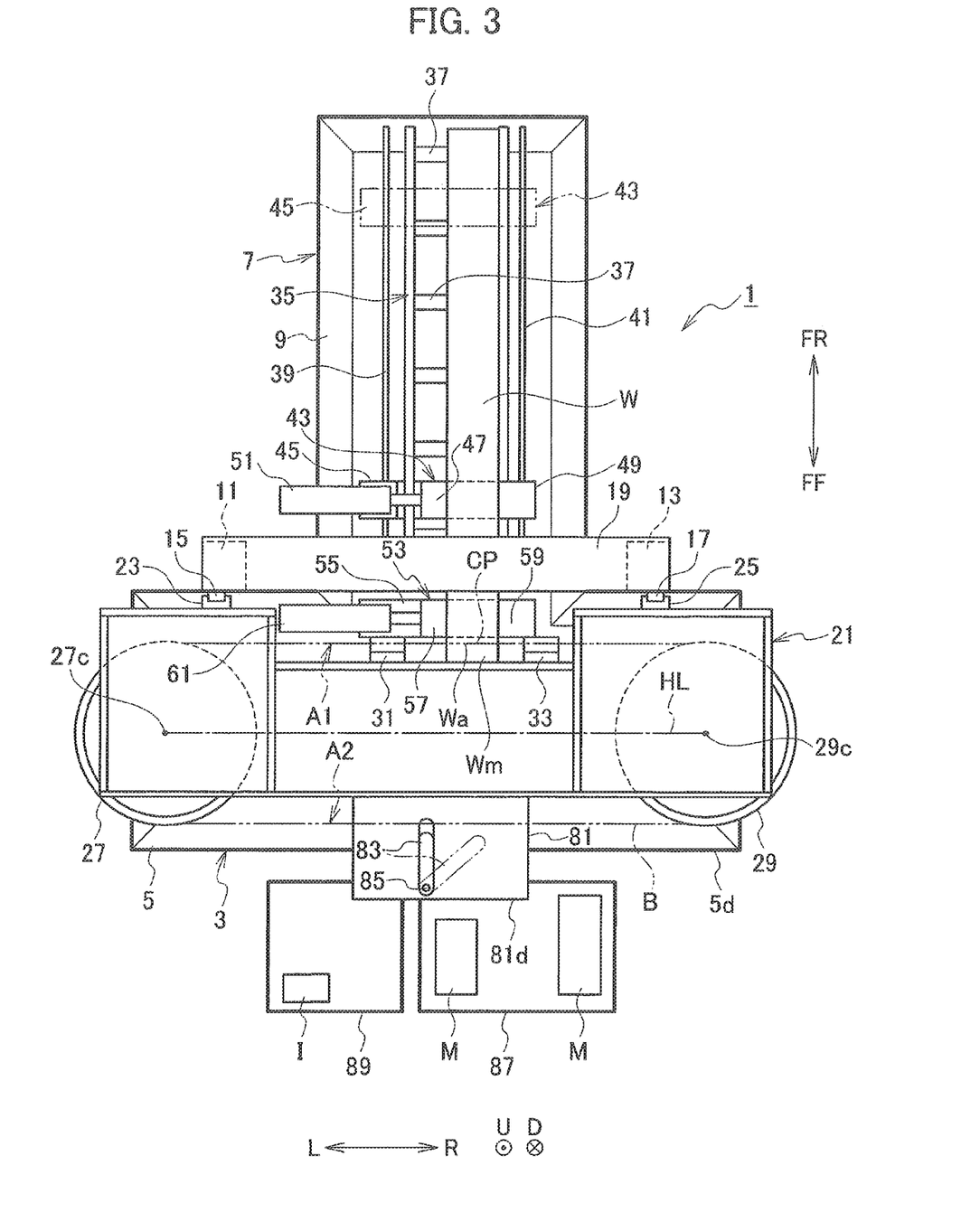
FIG. 3 is a plan view of the band saw machine.
Figure 4:
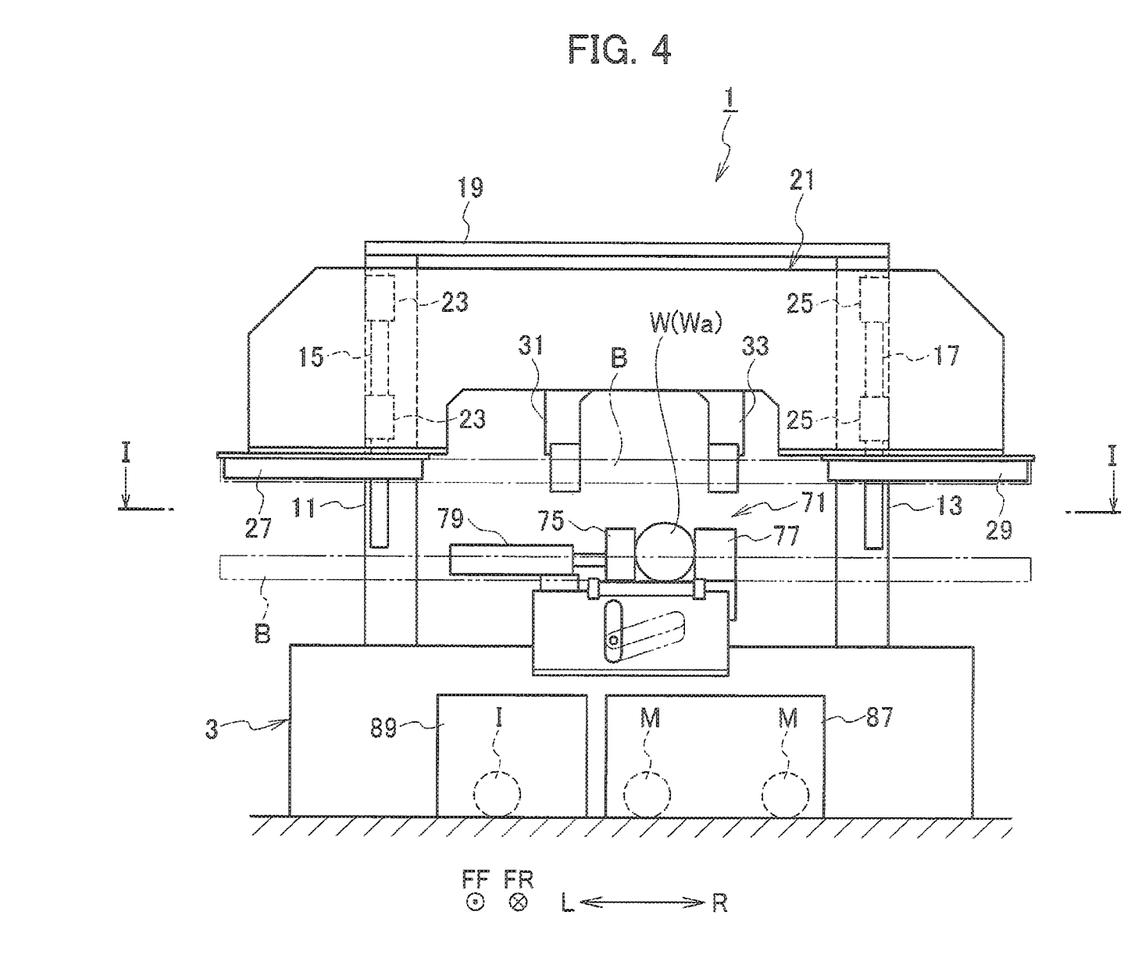
FIG. 4 is a front view of the band saw machine.

The band saw machine 1 according to the present embodiment further has following configurations. As shown in FIG. 1 and FIG. 3, a working-side running area (running line) A1 of the band saw blade B running through the cutting position CP and a working-opposite-side running area (running line) A2 of the band saw blade B running at a position distanced from the cutting position in the feed direction are positioned within the oil pan 5 in a plan view. Note that the oil pans 5 and 9 are not shown in FIG. 2 and FIG. 4 in order to show configurations within the oil pans 5 and 9. In addition, the upstream end 81*u* of the discharge chute 81 is located on a downstream side from a wheel center line HL connecting rotational centers 27*c* and 29*c* of the pair of saw blade wheels 27 and 29. If the upstream end 81*u* of the discharge chute 81 is located on the downstream side from the wheel center line HL, cutting oil supplied to the band saw blade B and cut dusts generated by cutting tend not to reach the discharge chute 81 (this is discovered on trial basis). Further, a portion of the discharge chute 81 on the downstream end 81*d* is protruded outside from the oil pan 5 (the downstream end 81*d* is positioned on a downstream side from a downstream end 5*d* of the oil pan 5).

Since the downstream main vise bed 73 is moved in the feed direction and in the opposite direction thereto by the for-downstream-main-vise cylinder or the like, the downstream main vise 71 functions also as a product feed mechanism for feeding a product M cut out from a workpiece W to the portion of the discharge chute 81 on the side of the upstream end 81u. Note that, although the downstream main vise functions as the product feed mechanism, the downstream feed rollers 65 may be changed from free rollers to drive rollers rotated by a discharge motor(s) (discharge actuator(s)). Alternatively, a pusher (not shown in the drawings) for pushing out a product M in the feed direction may be used.

Subsequently, operations and advantages of the present embodiment will be explained. A workpiece W is fed onto the upstream feed table 35, and then a portion of the workpiece W is interposed between the pair of feed vise jaws 47 and 49. Next, the first feed vise jaw 47 is moved rightward by the for-feed-vise oil hydraulic cylinder 51, and thereby the workpiece W is clamped by the pair of feed vise jaws 47 and 49. Then, the feed vise bed 45 (the feed vise 43) is moved in the feed direction by the for-feed-vise electric motor (not shown in the drawings) or the like. According to this, the workpiece W is fed in the feed direction and a cut portion Wa of the workpiece W is set at the cutting position CP. At this time, another portion of the is interposed between the pair of upstream main vise jaws 57 and 59, and a product correspondent portion Wm of the workpiece W is interposed between the pair of downstream main vise jaws 75 and 77.

After the cut portion Wa of the workpiece W is set at the cutting position, the first upstream main vise jaw 57 is moved rightward by the for-upstream-main-vise oil hydraulic cylinder 61 and thereby the workpiece W is clamped by the pair of upstream main vise jaws 57 and 59. In addition, the first downstream main vise jaw 75 is moved rightward by the for-downstream-main-vise oil hydraulic cylinder 79 and thereby the product correspondent portion Wm of the workpiece W is clamped by the pair of downstream main vise jaws 75 and 77. According to these, the workpiece W is fixed firmly on the base 3.

After the workpiece W is fixed on the base 3, the pair of saw blade wheels 27 and 29 is rotated by the for-wheel electric motor, and thereby the band saw blade B is circularly run. Then, the saw blade housing 21 is moved downward by the for-saw-blade-housing electric motor(s) or the like. According to these, the cut portion Wa of the workpiece W is cut, and thereby a product M is cut out from the workpiece W. Note that, while cutting the workpiece W, cutting oil is supplied appropriately to the band saw blade B by the cutting oil supply device and cut dusts are generated. In addition, in a case where a so-called leading-end cutout or the like is done at the cut portion Wa on a leading-end side of the workpiece W, an offcut I is cut out from the workpiece W.

After the product M is cut out from the workpiece W, the downstream main vise bed 73 (the downstream main vise 71) is moved in the feed direction by the for-downstream-main-vise cylinder (not shown in the drawings) or the like. According to this, the product M is fed in the feed direction, and thereby fed to a portion of the discharge chute 81 on the upstream end 81u. Therefore, the product M is discharged to the outside of the oil pan 5 (the outside of the base 3) through the discharge chute 81 due to its own weight.

Here, the working-side running area A1 of the band saw blade B and the working-opposite-side running area A2 of the band saw blade B are positioned within the oil pan 5 in a plan view. Therefore, the cutting fluid adhered to the band saw blade B and the cut dusts are restricted from being directly discharged to the outside of the oil pan 5 (the outside of the base 3).

In addition, the upstream end 81u of the discharge chute 81 is positioned on a downstream side from the wheel center line HL. Therefore, the cutting oil supplied to the band saw blade B and the cut ducts generated by cutting tend not to reach the discharge chute 81, and thereby they are restricted from being discharged to the outside of the oil pan 5 through the discharge chute 81.

Therefore, according to the present embodiment, the product M is fed to a portion of the discharge chute 81 on the side of the upstream end 81u by the downstream main vise 71. According to this, the product M can be discharged certainly to the outside of the oil pan 5 without positioning the upstream end 81u of the discharge chute 81 at the cutting position CO or positioning the upstream end 81u closer to the cutting position.

In addition, according to the present embodiment, the cutting oil adhered to the band saw blade B and the cut dusts can be restricted from being directly discharged to the outside of the oil pan 5, and the cutting oil and the cut dusts can be restricted from being discharged to the outside of the oil pan 5 through the discharge chute 81. Therefore, the cutting oil and the cut dusts can be sufficiently restricted from being scattered on a floor of a factory, and thereby working environment can be improved.

Namely, according to the present embodiment, working environment can be improved by restricting the cutting fluid and the cut ducts from being scattered on a floor of a factory while discharging the product M certainly to the outside of the oil pan 5.

Second Embodiment

Figure 5:
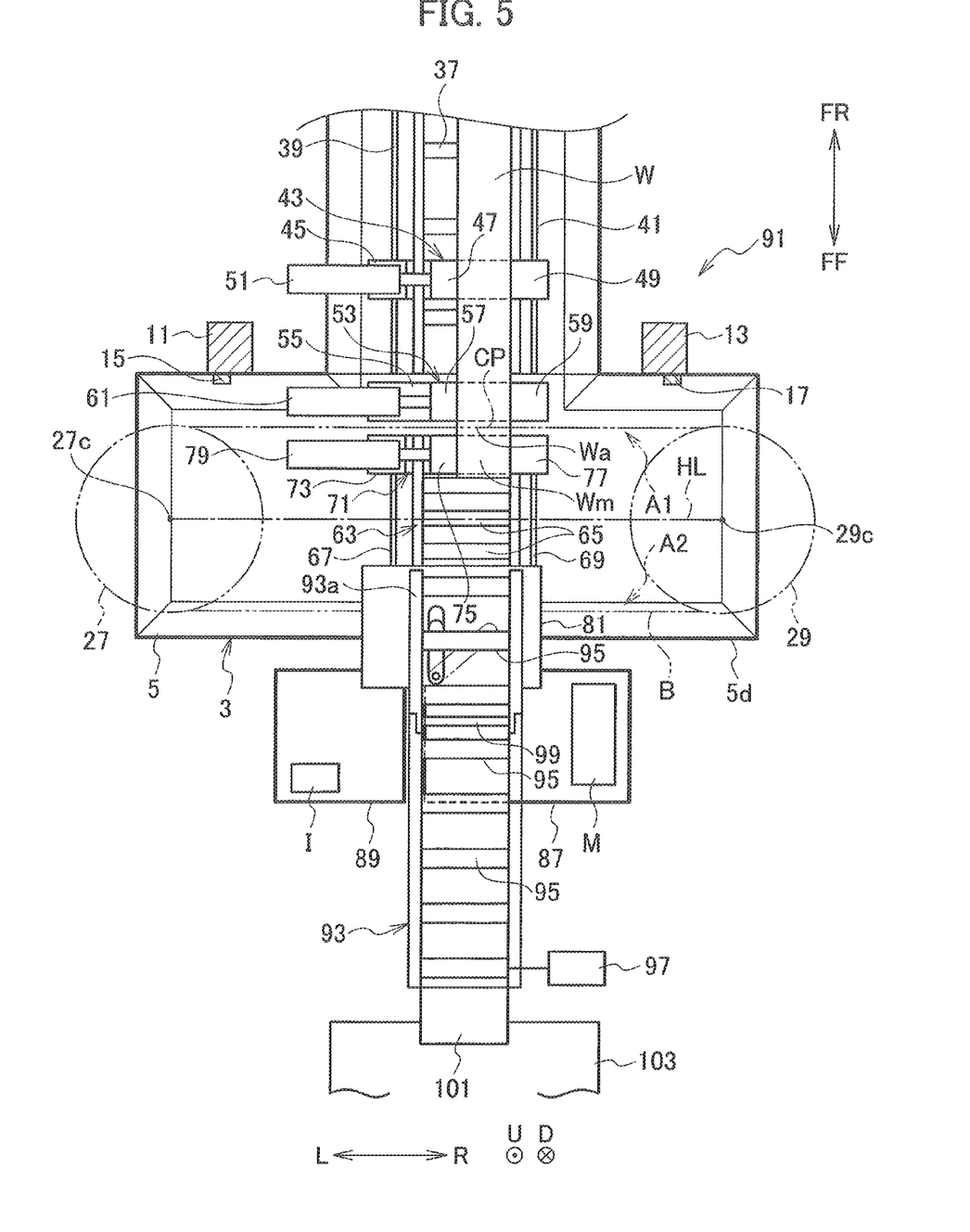
FIG. 5 is a partially cross-sectioned plan view showing a lower portion of a band saw machine according to a second embodiment.
Figure 6:
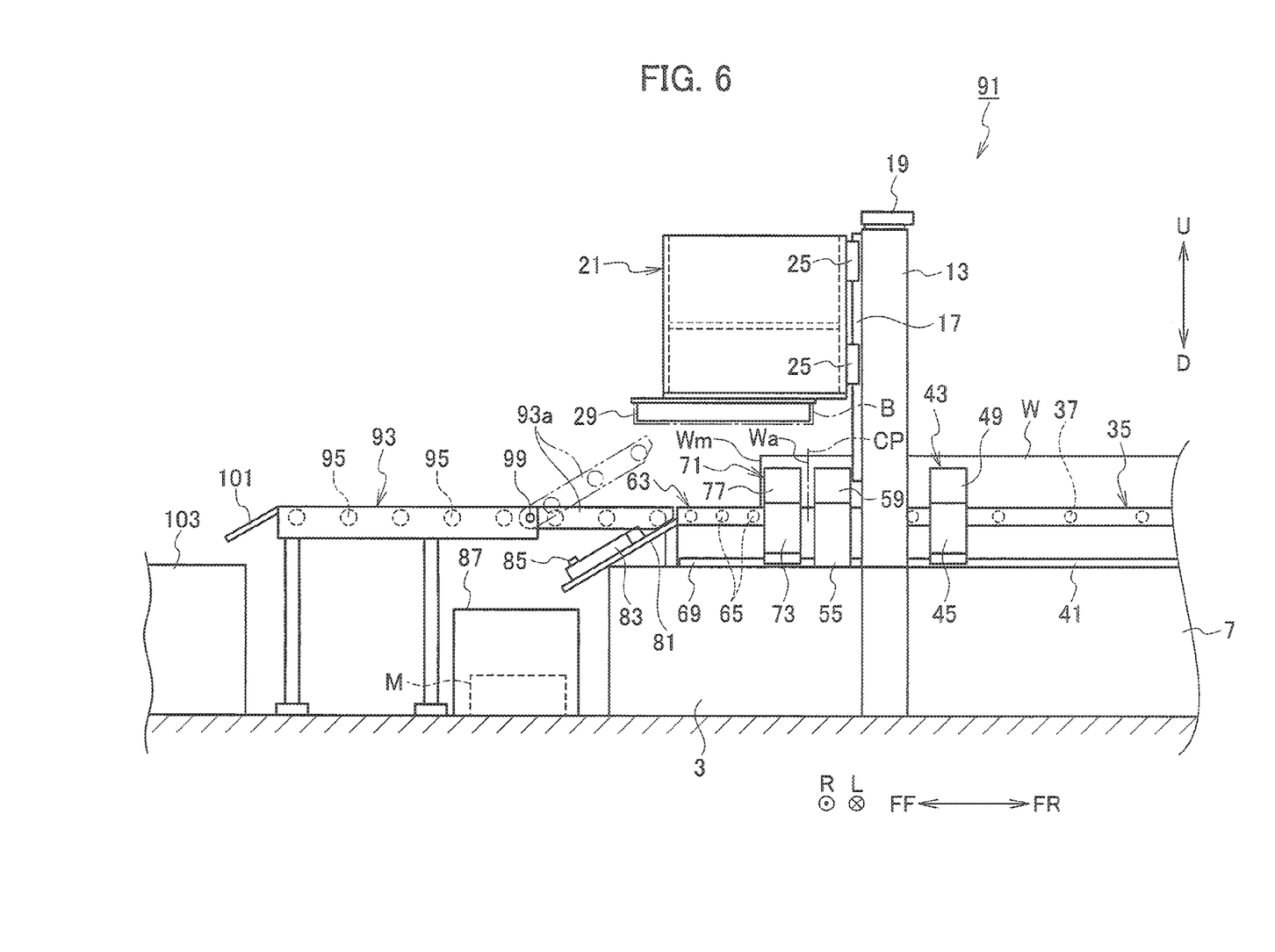
FIG. 6 is a side view of the band saw machine.

As shown in FIG. 5 and FIG. 6, a band saw machine 91 according to a second embodiment has almost similar configurations to those of the band saw machine 1 according to the above first embodiment (see FIG. 1 to FIG. 4).

Hereinafter, only configurations of the band saw machine 91 different from the configuration of the band saw machine 1 will be explained. Note that, among plural configurational elements of the band saw machine 91, identical or equivalent configurational elements to the configurational elements of the band saw machine 1 are labelled with identical reference numbers.

The band saw machine 91 includes a discharge roller conveyor 93 provided on the front side of the base 3, in addition to the discharge chute 81, as the discharge table. The discharge roller conveyor 93 has plural drive rollers (discharge rollers) 95 aligned in the feed direction at intervals. The plural drive rollers 95 are rotatable about each axial center parallel to the feed width direction by a discharge motor (discharge actuator) 97.

An upstream-side portion 93a of the discharge roller conveyor 93 is located on an upper side of the discharge chute 81. The upstream-side portion 93a of the discharge roller conveyor 93 is swingable (movable) in the up-down direction about a swing axis 99 by a for-conveyor oil hydraulic cylinder (not shown in the drawings). In other words, the upstream-side portion 93a of the discharge roller conveyor 93 can be switched between a horizontal state and a sloped state by the for-conveyor oil hydraulic cylinder. The discharge roller conveyor 93 includes, at its downstream-side end, a supplemental chute 101 for discharging a product M to the outside from the discharge roller conveyor 93. The product M discharged from the supplemental chute 101 is collected by a product box 103 disposed on a front side of the discharge roller conveyor 93.

Subsequently, only operations of the second embodiment that are different from the operations of the first embodiment will be explained. In a case where a product M is long, the upstream-side portion 93a of the discharge roller conveyor 93 is set in the horizontal state by the for-conveyor oil hydraulic cylinder. Then, the downstream main vise bed 73 (the downstream main vise 71) is moved in the feed direction by the for-downstream-main-vise cylinder or the like after the product M is cut out from the workpiece W, similarly to the operations of the first embodiment. According to this, the product M is fed in the feed direction to be fed to the upstream-side portion 93a of the discharge roller conveyor 93. And then, the product M is discharged to the outside of the oil pan 5 (the outside of the base 3) by the discharge roller conveyor 93 (the discharge motor 97).

In a case where a product M is short, the upstream-side portion 93a of the discharge roller conveyor 93 is set in the sloped state by the for-conveyor oil hydraulic cylinder. Then, the downstream main vise bed 73 is moved in the feed direction by the for-downstream-main-vise cylinder or the like after the product M is cut out from the workpiece W, similarly to the operations of the first embodiment. According to this, the product M is fed in the feed direction to be fed to a side of the upstream end 81u of the discharge chute 81. And then, the product M is discharged to the outside of the oil pan 5 through the discharge chute 81 due to its own weight.

Also according to the second embodiment, equivalent advantages to those brought by the first embodiment can be brought.

Note that the present invention is not limited to the above embodiments, and can be modified variously. For example, the upstream end 81u of the discharge chute 81 may be positioned on a downstream side from the working-opposite-side running area A2 of the band saw blade B. In this case, the downstream main vise 71 feeds the product M to a side of the upstream end 81u of the discharge chute 81 after getting it through the working-opposite-side running area A2. In addition, in the second embodiment, only the discharge roller conveyor 93 is used as the discharge table by omitting the discharge chute 81.

The aspect of the present invention may be also defined as below.

1. A band saw machine for cutting a cut portion of a workpiece set at a cutting position on a feed direction while running an endless band saw blade circularly, the machine comprising:
    a base that has a cutting fluid reservoir for collecting cutting fluid;
    a saw blade housing that is provided at the base and is movable in an up-down direction;
    a pair of rotatable saw blade wheels provided in the saw blade housing, the saw blade wheels being distanced from each other in a feed width direction perpendicular to the feed direction and supporting the band saw blade with the band saw blade wound therearound;
    a saw blade guide that guides the band saw blade so as to make tooth ends of the band saw blade perpendicular to the workpiece at the cutting position;
    a downstream main vise that is provided on a downstream side of the cutting position on the base and has a pair of downstream main vise jaws for clamping a product correspondent portion of the workpiece;
    a discharge table for discharging a product cut out from the workpiece to an outside of the cutting fluid reservoir; and
    a product feed mechanism that feeds the product to a side on an upstream end of the discharge table, wherein
    a working-side running area of the band saw blade running through the cutting position and a working-opposite-side running area of the band saw blade running at a position distanced from the cutting position in the feed direction are positioned within the cutting fluid reservoir,
    the upstream end of the discharge table is positioned on a downstream side from a wheel center line connecting rotational centers of the pair of saw blade wheels.

2. The band saw machine according to the above 1, wherein the downstream main vise is movable in the feed direction and functions also as the product feed mechanism.

3. The band saw machine according to the above 1 or 2, wherein
    the discharge table is a discharge chute, the discharge chute being sloped so that a downstream end thereof is located lower than the upstream end or being configured to be able to be sloped.

4. The band saw machine according to the above 1 or 2, wherein
    the discharge table is a discharge roller conveyor including drive rollers, the drive rollers being aligned in the feed direction at intervals and being able to be rotated by a discharge actuator.

5. The band saw machine according to the above 1 or 2, wherein
    the discharge table includes a discharge chute sloped so that a downstream end thereof is located lower than the upstream end, and a discharge roller conveyor including drive rollers that are aligned in the feed direction at intervals and can be rotated by a discharge actuator, and
    a portion of the discharge roller conveyor on a side of the upstream end thereof is located on an upper side of the discharge chute, and is movable in the up-down direction.

6. The band saw machine according to any one of the above 1 to 5, further comprising
    a feed vise that is provided on an upstream side of the cutting position movably in the feed direction, and has a pair of feed vise jaws for clamping the workpiece.

7. The band saw machine according to any one of claims 1 to 6, further comprising
    an upstream main vise that is provided just on an upstream side of the cutting position on the base, and has a pair of upstream main vise jaws for clamping the workpiece.

The entire contents of a Japanese Patent Application No. 2015-210721 (filed Oct. 27, 2015) are incorporated herein by reference. Although the invention has been described above by reference to embodiments of the invention, the invention is not limited to the embodiment described above. Scope of the present invention is determined in the context of the claims.

The invention claimed is:

1. A band saw machine for cutting a cut portion of a workpiece set at a cutting position on a feed direction while running an endless band saw blade, the machine comprising:
    a base that has a cutting fluid reservoir for collecting cutting fluid at an upper portion thereof;
    a saw blade housing that is provided at the base movably in an up-down direction;
    a pair of saw blade wheels that are provided rotatably in the saw blade housing to support the band saw blade and distanced from each other in a feed width direction perpendicular to the feed direction, the band saw blade being wound around the saw blade wheels in a tilted-down state so as to regulate a maximum cut length of the workpiece by a diameter thereof, and the pair of saw blade wheels is positioned in a plane that extends both parallel to the feed direction and perpendicular to the up-down direction;

a saw blade guide that guides the band saw blade so as to make tooth ends of the band saw blade perpendicular to the workpiece at the cutting position;

a downstream main vise that is provided on a downstream side of the cutting position on the base and has a pair of downstream main vise jaws for clamping a product correspondent portion of the workpiece; and a discharge table for discharging a product to an outside of the cutting fluid reservoir, wherein a working-side running area of the band saw blade running through the cutting position and a working-opposite-side running area of the band saw blade running at a position distanced from the cutting position in the feed direction are positioned within the cutting fluid reservoir in a plan view, the working-side running area being positioned upstream from the working-opposite-side running area along the feed direction, an upstream end of the discharge table is positioned on a downstream side from a wheel center line connecting rotational centers of the pair of saw blade wheels, and the downstream main vise is configured to be movable in the feed direction between the working-side running area within the cutting fluid reservoir and the upstream end of the discharge table, the base including, on a downstream side of the cutting position and along the feed direction, a downstream feed table for supporting the workpiece movably in the feed direction, wherein the discharge table is a discharge chute pivotably mounted at one end to the downstream feed table, and wherein the discharge chute is configured to pivot at the one end from a first position at which the discharge chute extends coplanar with the downstream feed table to a second position at which the discharge chute is inclined downwardly with respect to the downstream feed table.

2. The band saw machine according to claim 1, further comprising
a feed vise that is provided on an upstream side of the cutting position movably in the feed direction, and has a pair of feed vise jaws for clamping the workpiece.

3. The band saw machine according to claim 1, further comprising
an upstream main vise that is provided just on an upstream side of the cutting position on the base, and has a pair of upstream main vise jaws for clamping the workpiece.

4. A band saw machine for cutting a cut portion of a workpiece set at a cutting position on a feed direction while running an endless band saw blade, the machine comprising:
a base that has a cutting fluid reservoir for collecting cutting fluid at an upper portion thereof;
a saw blade housing that is provided at the base movably in an up-down direction;
a pair of saw blade wheels that are provided rotatably in the saw blade housing to support the band saw blade and distanced from each other in a feed width direction perpendicular to the feed direction, the band saw blade being wound around the saw blade wheels in a tilted-down state so as to regulate a maximum cut length of the workpiece by a diameter thereof, and the pair of saw blade wheels is positioned in a plane that extends both parallel to the feed direction and perpendicular to the up-down direction;
a saw blade guide that guides the band saw blade so as to make tooth ends of the band saw blade perpendicular to the workpiece at the cutting position;
a downstream main vise that is provided on a downstream side of the cutting position on the base and has a pair of downstream main vise jaws for clamping a product correspondent portion of the workpiece; and
a discharge table for discharging a product to an outside of the cutting fluid reservoir, wherein
a working-side running area of the band saw blade running through the cutting position and a working-opposite-side running area of the band saw blade running at a position distanced from the cutting position in the feed direction are positioned within the cutting fluid reservoir in a plan view, the working-side running area being positioned upstream from the working-opposite-side running area along the feed direction,
an upstream end of the discharge table is positioned on a downstream side from a wheel center line connecting rotational centers of the pair of saw blade wheels,
the band saw machine comprises a product feed mechanism that feeds the product cut out from the workpiece to a side on an upstream end of the discharge table,
the base including, on a downstream side of the cutting position and along the feed direction, a downstream feed table for supporting the workpiece movably in the feed direction,
the discharge table includes a discharge chute pivotably mounted at one end to the downstream feed table,
wherein the discharge chute is configured to pivot at the one end from a first position at which the discharge chute extends coplanar with the downstream feed table to a second position at which the discharge chute is inclined downwardly with respect to the downstream feed table,
the discharge table further including a discharge roller conveyor including drive rollers that are aligned in the feed direction at intervals and can be rotated by a discharge actuator, and
a portion of the discharge roller conveyor on a side of an upstream end thereof is located on an upper side of the discharge chute, and is movable in the up-down direction.

\* \* \* \* \*